(12) United States Patent  
Steinhuber

(10) Patent No.: US 6,204,966 B1  
(45) Date of Patent: Mar. 20, 2001

(54) BINOCULAR TELESCOPIC MAGNIFYING SPECTACLES

(76) Inventor: Wolfdietrich Steinhuber, Franz-Josef-Strasse 5, A-6130 Schwaz (AT)

( * ) Notice: Subject to any disclaimer, the term of this patent is extended or adjusted under 35 U.S.C. 154(b) by 0 days.

(21) Appl. No.: 09/297,167

(22) PCT Filed: Oct. 20, 1997

(86) PCT No.: PCT/EP97/05778

§ 371 Date: Apr. 26, 1999

§ 102(e) Date: Apr. 26, 1999

(87) PCT Pub. No.: WO98/19204

PCT Pub. Date: May 7, 1998

(30) Foreign Application Priority Data

Oct. 25, 1996 (AT) ..................................................... 1873/96

(51) Int. Cl.⁷ ................................................ G02B 23/00
(52) U.S. Cl. ......................... 359/407; 359/411; 359/415
(58) Field of Search ..................................... 359/407, 408, 359/409, 410, 411, 412, 415, 480, 481

(56) References Cited

U.S. PATENT DOCUMENTS

| | | | |
|---|---|---|---|
| 1,033,965 | * 7/1912 | Troppman | 359/481 |
| 3,029,696 | * 4/1962 | Schmidt | 359/411 |
| 5,572,361 | * 11/1996 | Kamiya et al. | 359/426 |
| 5,604,631 | * 2/1997 | Gelardi et al. | 359/412 |
| 5,966,239 | * 10/1999 | Shirayanagi et al. | 359/481 |

FOREIGN PATENT DOCUMENTS

| | | |
|---|---|---|
| 4004248 | * 8/1990 | (DE) . |
| 9303663 | * 6/1993 | (DE) . |
| 9117465 | * 11/1991 | (WO) . |
| 9609566 | * 3/1996 | (WO) . |

* cited by examiner

*Primary Examiner*—Cassandra Spyrou  
*Assistant Examiner*—Mark A. Robinson  
(74) *Attorney, Agent, or Firm*—Brown & Wood, LLP

(57) ABSTRACT

Binocular telescopic magnifying spectacles, both telescopes of which are pivotally mounted on a common plane, wherein each imaginary pivoting axis (8) of the telescopes 91) lies outside the telescopes (1) and on the side opposite the telescopes (1) of the ocular exit pupil (9) at a distance (d) from the ocular exit pupil (9), which is smaller than the diameter of the eye (D). The adjustment device for convergence and the adjustment device for the distance are mechanically coupled.

26 Claims, 5 Drawing Sheets

BINOCULAR TELESCOPIC MAGNIFYING SPECTACLES

Figure 1:
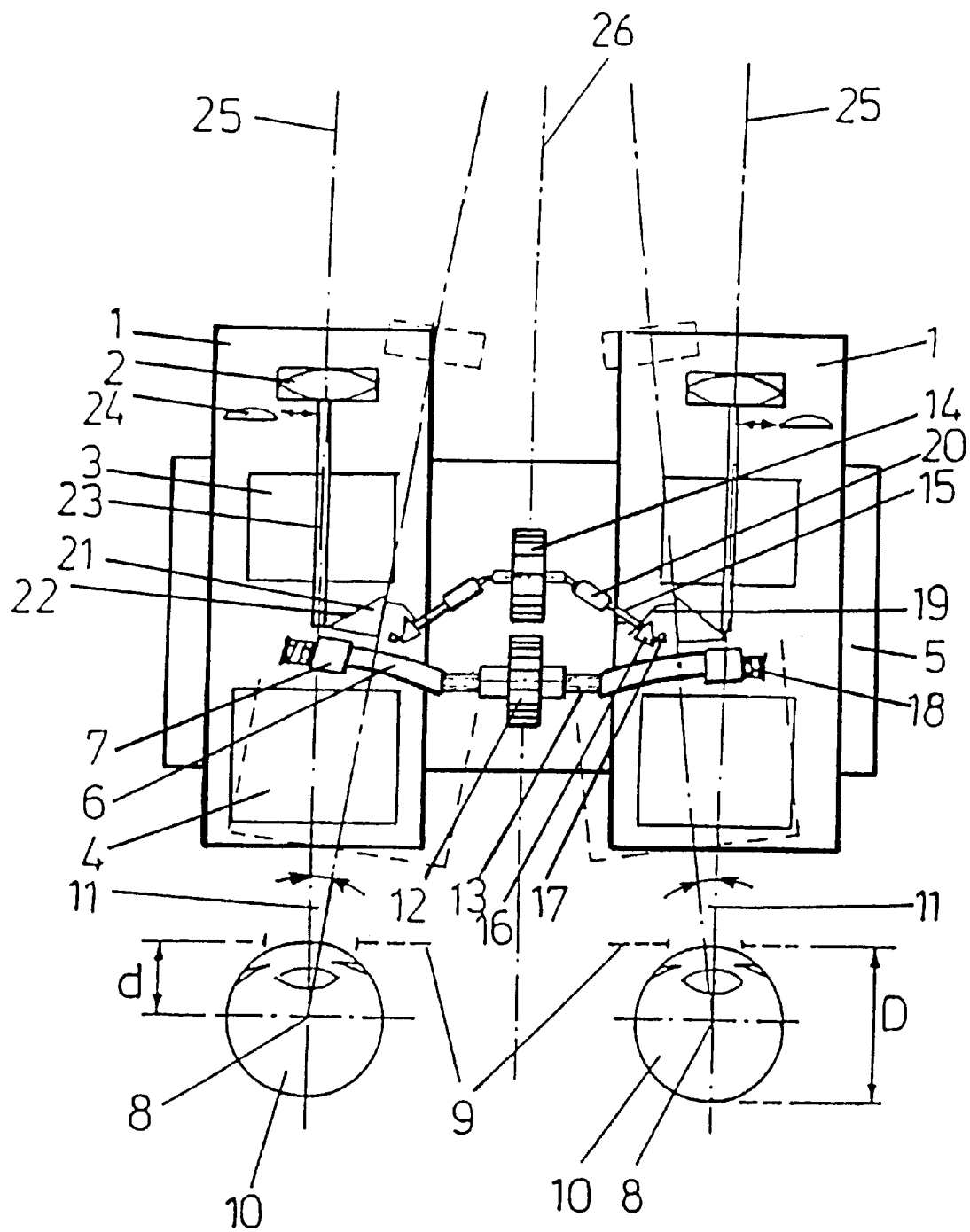

The invention relates to binocular telescopic magnifying spectacles with features recited in the preamble of claim 1.

Such binocular telescopic magnifying spectacles or close-up spectacles are designed as visual aids for weak-sighted and as operational spectacles. To this end, they are adjusted by the user in accordance with a distance between the eyes. In case the telescopic magnifying spectacles need be used for different operational distances, the pupil distance even for the same user does not remain constant at the different operational distances. For an infinite distance, the visual axes of the eyes remain parallel, for a close-up region, they converge, whereby, on one hand, the angle of the visual axes changes, and, on the other hand, the pupil distance diminishes. Further, with convergence, the distance of the eye pupils from the apparatus (cornea vertex distance) changes.

In the known telescopic magnifying spectacles, the above-mentioned conditions are partially adjusted. In the binocular telescopic magnifying spectacles according to German Publication DE 40 04 248 A1, a correct axis setting is effected along an arc the center of which lies in the eye center, however no coupling of the axis setting with the distance setting takes place. This means that the user should set a correct axis setting for a predetermined distance or set a correct distance for a predetermined axis setting. Further, the axis setting of the right and left tubes should be done separately, which creates additional operational difficulties. In the known binocular telescopic magnifying spectacles according to Austrian publication AT 000 307 U1, the distance between the tube axes is adjusted with a servo motor to a correct parallax in accordance with the distance. However, this movement is rectilinear so that the apparatus pupils are spaced from the eye with an increasing convergence, whereby the observable visual field is essentially trimmed when the apparatus is supported by an end collar. In the known binocular telescopic magnifying spectacles according to 98 782 B, the axis setting takes place along a spatial curve which is defined by an outer link secured at one side. At the convergence, the apparatus horizon changes. Likewise, for retaining the cornea distance, the horizon should be retained.

For all of the above-described and known apparatuses, it is common that they cannot be used as binoculars, in which only the eye distance and the distance need be set, rather additional, time-consuming, complicated and excessive settings to be effected by a user are required.

An object of the invention is to eliminate these drawbacks and to simplify the setting of the binocular telescopic magnifying spectacles which, according to the invention, is achieved by features and measures which form the content and the subject matter of the characterized clause of claim 1. The eye diameter in an adult amounts to about 24 mm. Because the pivot axes of both telescope optics are spaced from ocular exit pupils, with smaller eye diameters, lie the pivot axes, respectively, inside the eyes of a user. Thereby, by a change of the operational distance and thereby of the convergence angle, the setting with respect to a changing pupil distance is essentially retained. Advantageously, the pivot axes are spaced from the ocular exit pupils, respectively, by approximately a half of the eye diameter, i.e., they lie in the eye center or the rotational center of the eye of the user, whereby the setting with respect to the eye distance, with a change of the operational distance, is retained to a most possible degree. Preferred embodiments of the invention are recited in dependent claims.

Figure 2:
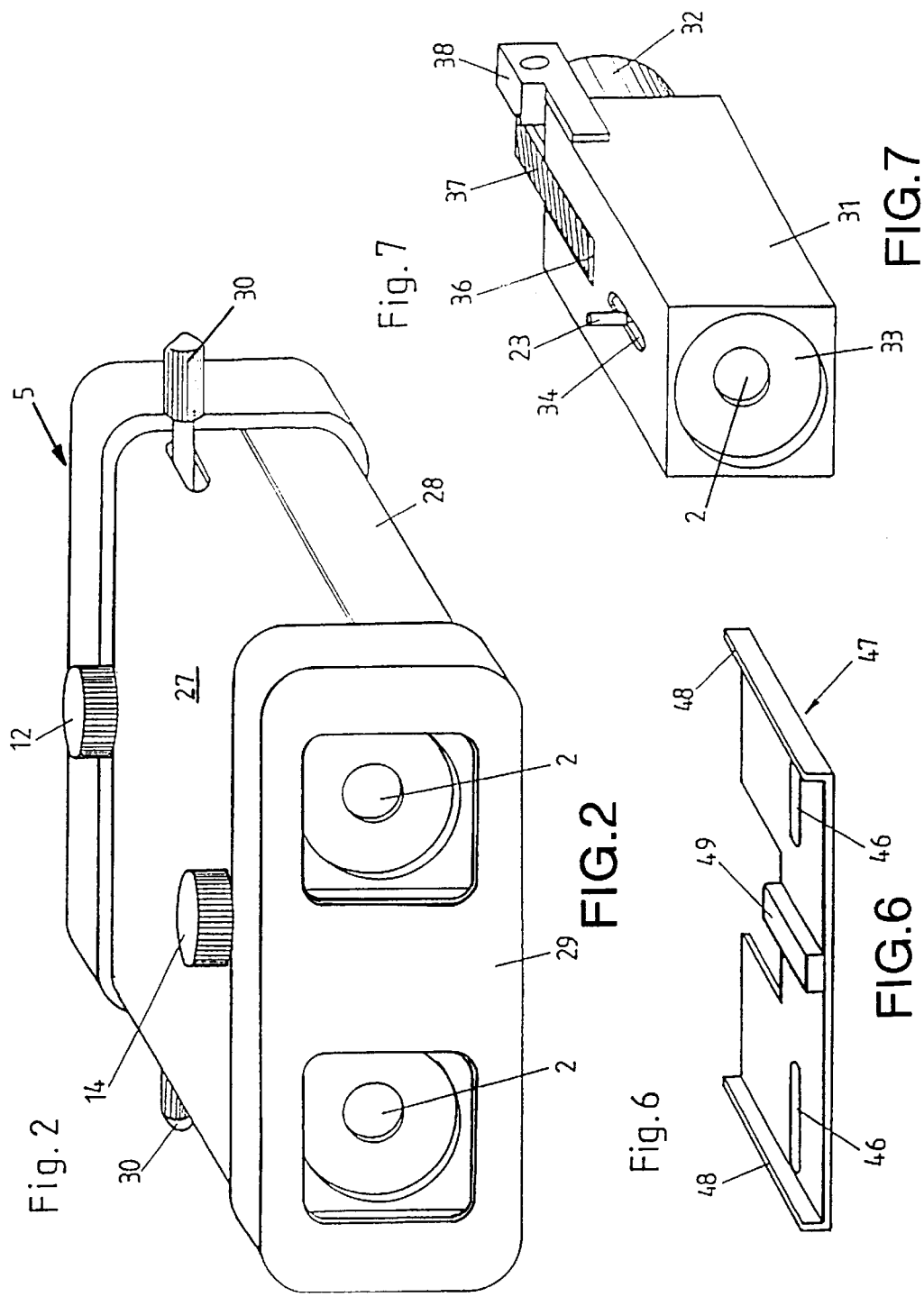
Figure 3:
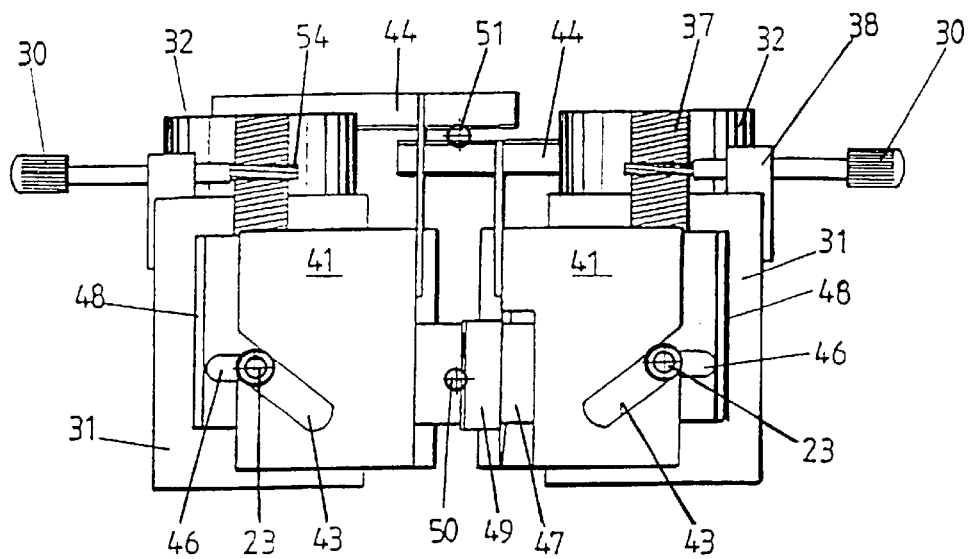
Figure 4:
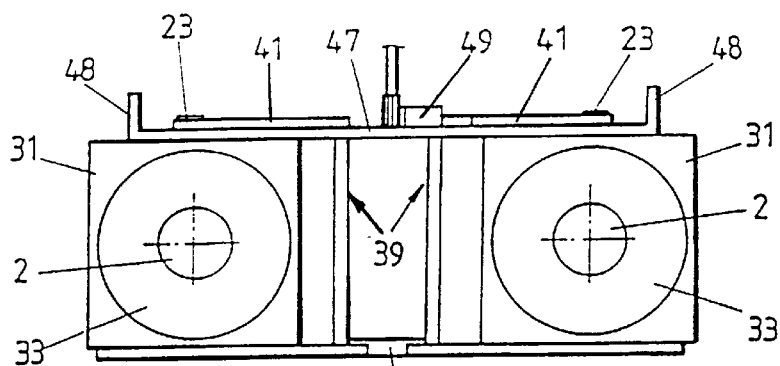
Figure 5:
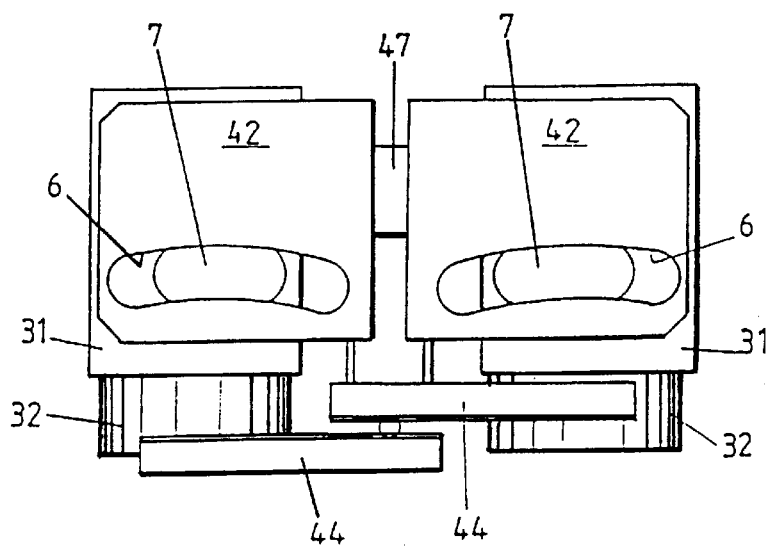
Figure 8:
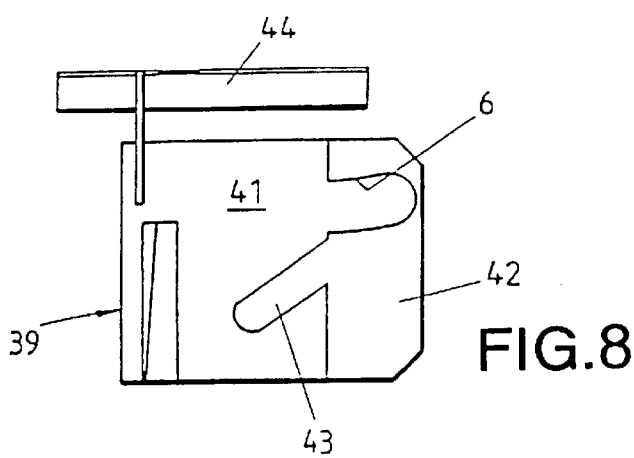
Figure 9:
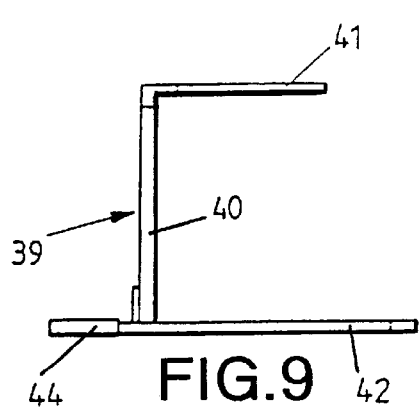
Figure 10:
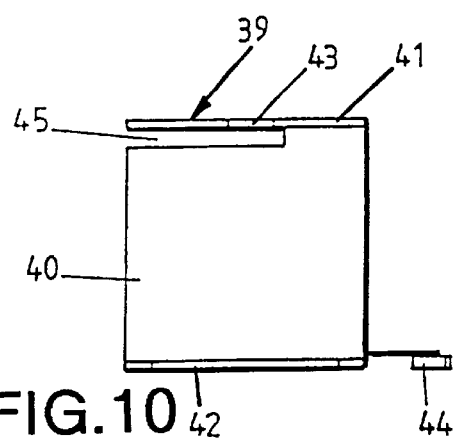
Figure 11:
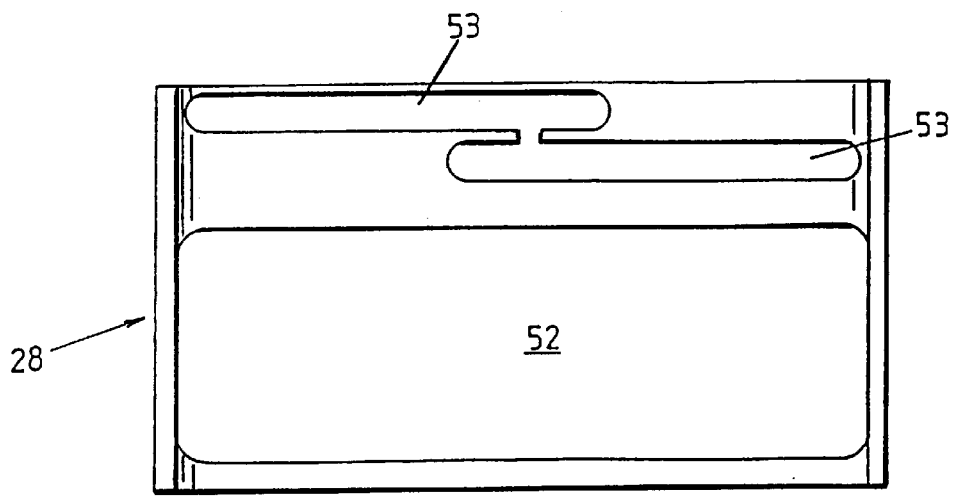
Figure 12:
Figures 13, 14:
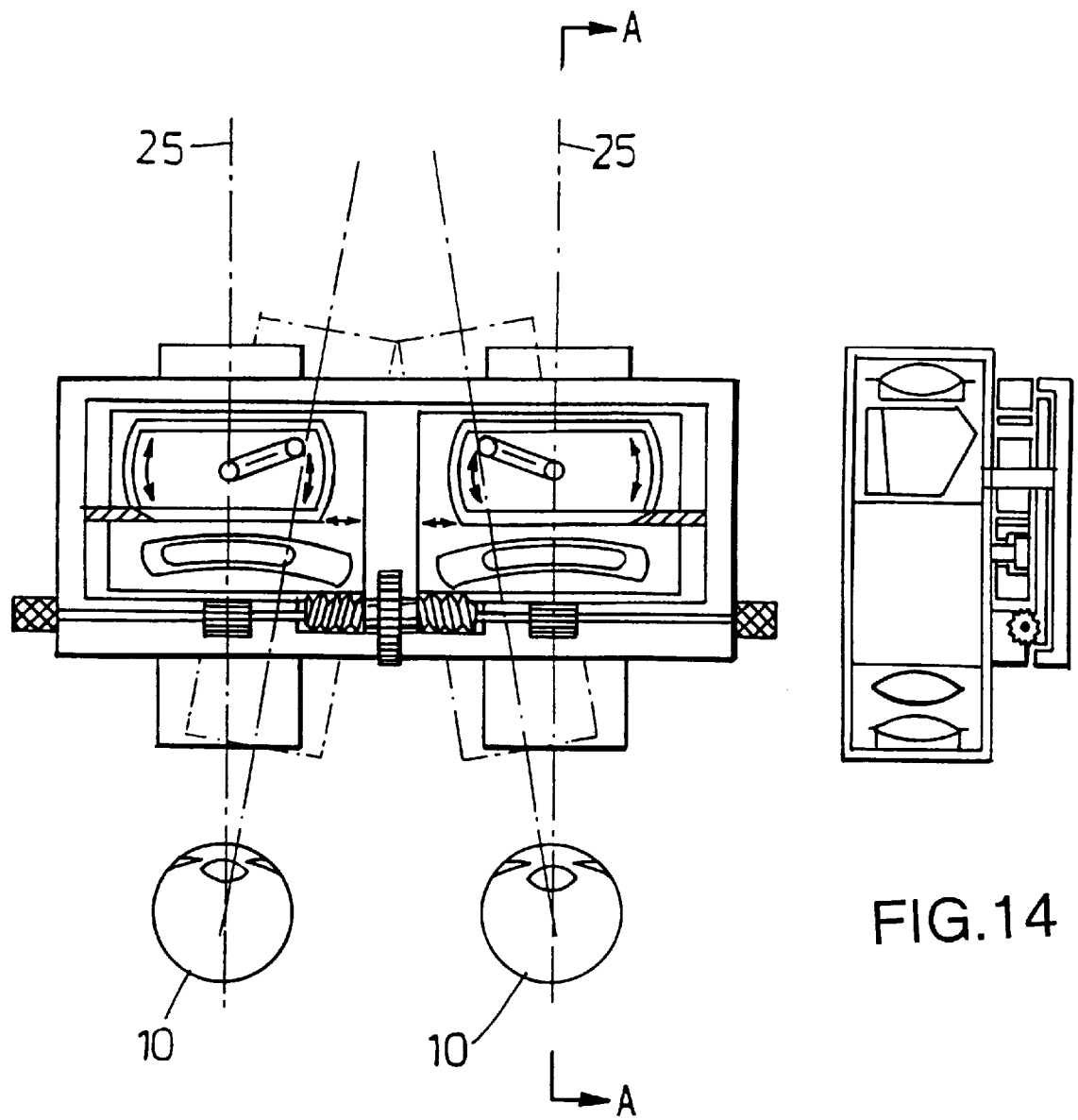

The invention will now be explained in detail with reference to the drawings, without limiting the invention to the shown embodiments. It is shown in:

FIG. 1 a schematic view of telescopic magnifying spectacles;

FIG. 2 a perspective view of an embodiment of telescopic magnifying spectacles;

FIG. 3 a plan view of the telescopic magnifying spectacles after the removal of the housing;

FIG. 4 a front view;

FIG. 5 a bottom view;

FIG. 6 a structural component with a control crank;

FIG. 7 a perspective angular view of a holder for a telescope;

FIGS. 8–10 plan, evaluational and side views, respectively, of a U-shaped part;

FIG. 11 a plan view of an inner side of a housing portion;

FIG. 12 its elevational view;

FIG. 13 a further schematic view; and

FIG. 14 a cross-sectional view along line A—A in FIG. 13.

A binocular telescopic magnifying spectacles include, in a conventional manner, left and right telescopes 1 which contain, respectively, an object lens 2, a reversing system or a reversing prism 3, and an ocular 4. Each of the telescopes 1 defines an ocular exit pupil 9 which represents an aperture stop and is spaced from the ocular 4 by a distance from 10 mm to 20 mm. The telescope 1 is so designed that during the use of the inventive telescopic magnifying spectacles, the cornea of the eye of a user lies somewhere in the region of the ocular exit pupil 9.

The telescopic 1 are pivotally supported in a plane in a housing 5. To this end, there are provided arcuate guideways 6 along which, respectively, likewise arcuate slides 7 are displaced, which are connected with respective telescopes 1. The center of circles of the guideways 6 form imaginary pivot axes 8 of the telescopes 1. In each position of the slides 7 on the guideways 6, the optical axes 25 of the telescopes 1 extend, respectively, radially to the guideways 6. The imaginary pivot axes 8 intersect, outside of the telescopes 1, their respective optical axes 25, in effect, at a distance of from a respective ocular exit pupil 9, which is smaller than the outer diameter D that amounts up to about 24 mm. Thereby, the imaginary pivot axis 8 lie within eyes 10 of the user. Advantageously, the imaginary pivot axes 8 are spaced from the respective ocular exist pupils 9 by from about 5 mm to about 20 mm.

In a convergence position of the eyes 10 at a convergence angle 11, the eyes 10 pivot about a pivot point that is spaced from the cornea by about 13.5 mm. Thereby the effective pupil distance is reduced at an increased convergence position of the eye 10. The magnifying spectacles follow this reduction of the pupil distance, only upon increase of the convergence angle 11, to a most possible extent. This is because the imaginary pivot axes 8 of the telescopes 1 lie inside of the eyes 10 of the user (in the drawings, for the sake of clarity, the ocular exit pupils 9 are shown only for the position of the telescopes 1 in which they extend parallel to each other). The smallest deviation takes place when the pivot points of the eyes and the pivot axes 8 coincide to a most possible extent. Therefore, in an advantageous embodiment of the invention, the distance between the ocular exit pupils 9 and pivot axes 8 amounts to about 13 mm.

The preliminary setting of the pupil distance, e.g., at focusing at an infinite object point, is effected with a set wheel 12. It has nuts which cooperate with draw-in bolts 13 with opposed threads which are connected with the guideways 6 or with parts connected with them. This pupil setting device also provides for displacement of the guideways 6 transverse to a center plane 26 of the housing 5 whereby a distance therebetween is adjusted.

For setting the convergence position of the telescopes 1, a set wheel 14 is provided. A pivotal movement of the set wheel 14 is transmitted by shafts 15 to respective eccentrics 16 which are mounted on the free ends of the respective shafts 15 and which have, on their front sides, screw surfaces which are engaged by members 17 fixedly connected with respective telescopes 1. The members 17 are biased against the respective screw surfaces by helical springs 18 which are supported against the end surfaces of the guideways 6 and bias the slides 7. At their rear sides, the eccentrics 16 are supported against members 19 fixedly connected with respective guideways 6. For adaptation to different eye distance settings effected with the set wheel 12, each shaft 15 has a length compensating member 20, which is shaped, e.g., as a profiled shaft and which does not rotate relative to a sleeve but is displaceable relative thereto in the axial direction.

The set wheel 14 connects the pivotal movements of both telescopes so that they have each the same convergence angle 11.

Further, there is provided a coupling device for coupling convergence setting with focusing or the distance setting of the telescopes. The coupling device has control members 21 which are fixedly connected with the guideways 6 and which have each at its side adjacent to the ocular, a control cam 22. The control cam 22 is engaged by an end of a control pin 23 the opposite end of which is connected with the object lens 2 displaceable along the optical axis 25. Upon a pivotal movement of the telescope 1, the control pin 23 slides along the control cam 22 whereby the axial position of the object lens 2 is so changed that the focus is retained at different convergence angles 11.

According to another embodiment of the invention, it is possible to provide a control system inverse to the above-described system, i.e., one which would change the focus instead of the convergence angle.

In the schematically shown embodiment, behind the object lens, there is provided, in the optical path, a pivotal lens 24, preferably, a plus lens. With pivotal movement of this lens 24, simultaneously, the length compensating member for changing the length of the control pin 23 also should be pivoted to retain the focus. By the pivotal movement of the lens 24, the magnification can be changed, at a constant working distance, preferably with the aid of the length compensating member, without the focus readjustment.

In accordance with a further advantageous embodiment of the present invention, both the reversing prisms 3 and the object lens 2 are axially displaceable, and their position is connected with the convergence angle 11. In a simplified case, the reversing prism 3 is fixedly connected with the object lens 2. However, separate control cams and pins can be provided. The coupling of the axial position of the reversing prisms 3 with the convergence angle 11 permits to set the distance of the reversing prisms from an intermediate image and thereby even at small dimensions of the reversing prisms, a most possibly large field of vision can be achieved.

The optimization of the opposite requirements between the maximal image field and the usable sizes of the apparatuses is solved by providing oculars for the inventive binoculars telescopic glasses which have advantageously a substantially rectangular surface with a format of a tv image (with a length to width ratio 4:3). To this end, two circular sections are cut off or ground off from a circular ocular by two parallel cuts. It is advantageous when an appearance of a rectangular, landscape image is seen as being substantially of the same size as an appearance of a circular image having a diameter corresponding to the larger side of the rectangle. Also, the rectangular shape of the ocular lenses results in a reduced weight. It is further advantageous when with such formation of the oculars, at least a portion of the field stop or the aperture stop, advantageously, the entire field or aperture stop have a rectangular shape, preferably with a length-to-width ratio of 4:3.

A concrete embodiment of the above-described binocular telescopic magnifying spectacles will be described below with reference to FIGS. 2–12, wherein the elements corresponding to those shown in the schematic view of FIG. 1 will be designated with the same reference numerals. The binocular telescopic magnifying spectacles have a body 5 with upper and lower body shells 27 and 28. Two lenses 2 are visible at the front side 29. Sidewise arranged set screws 30 serve for the eyesight corrections. The set wheel 12 is used for the setting of the pupil distance, and the set wheel 14 is used for the setting of the convergence. FIGS. 3 to 5 show the construction of the binocular telescopic magnifying spectacles with the body 5 being removed.

Tubes 32 and 33 are supported, in an aligned arrangement, in a parallelpiped-shaped holder 31 for axial displacement, with one tube 32 receiving the respective ocular 4 and the other tube 33 receiving the object lens 2 and the reversing prisms 3. An elongate groove 34 is provided on the upper side of the holder 31. A control pin 23 extends through the elongate groove 34 and has its other end connected with the tube 33 of the object lens 2. Further, an axially extending cut-out 36, which is open at one of its sides, is formed on the upper side of the holder 31. A tooth rack 37, which is connected fixedly with the tube 32 of the ocular 4, lies in the cut-out 36. A one-sided, flanged-on support 38 serves for receiving the set screw 30. A slide 7 is secured on the bottom of the holder 31, not visible in FIG. 7. The two tubes 32 and 33, together with optical lenses, form a telescope 1.

Each holder 31 is received in a U-shaped member 39 different views of which are shown in FIGS. 8–10. The member 39 has a vertical web 40 and upper and lower cheeks 41 and 42. An arcuate guideway 6 is formed in the lower cheek 42. An inclined control slot 43 is provided in the upper cheek 41 opposite the middle plane 26. A tooth rack 44 is also secured to the lower cheek 42. A slot 45 is provided between the vertical web 40 and the upper cheek 41. The construction of both U-shaped members is the same but in a mirror-image presentation, the only difference consisting in different spacing of respective tooth racks 44 from the respective members 29. Thereby, with a functionally identical construction of the holders 31, the two tooth racks are spaced from each other, with a pinion 51 (FIG. 3) being arranged in a space therebetween.

A second control slot 46 is contained in the already mentioned slot 45 formed in the member 39. The control slot 46 is formed in a strip-shaped constructional element 47 (FIG. 6) and consists of two rectilinear elongate slots. The strip-shaped constructional element 47 has, on its smaller sides, upward bent edges 48 and, in the middle, a tooth strip 49. The control slot 46 extends rectilinear and at a right angle to the tooth strip 49. The tooth strip 49 is engaged by a pinion 50 which is connected with the set wheel 14. The above-mentioned pinion 51, which lies between two tooth racks 44 of the members 39, is connected with the set wheel 12.

When the above-described separate elements are mounted in the housing 5, the lower cheeks 42 of the U-shaped members 39 lie in the groove-like indentation 52 which is formed in the housing shell 28 (FIG. 11) and which serves as a guide. At that, the tooth racks 44 are located adjacent to each other. The tooth racks 44, which are secured to the respective members 39, are received in grooves 53 formed in the housing shell 28. The constructional strip-shaped element 47 lies beneath the upper cheek 41 of the member 39 and above the upper side of the holder 31. Thereby, the control slots 43 and 46 cross each other, with the control pin 23, which is connected with the object lens-receiving tube 33 of the respective telescope 1, lying in the intersection point of the control slots. The upward bent edges 48 of the strip-shaped constructional element 47, together with the control slot 46, extend into guide grooves formed in the inner side of the upper housing shell 27, not shown here. In the views shown in FIGS. 3–5, the optical axes 25 of the telescopes 1 extend parallel to each other. For setting the distance between the two optical axes 25, the set wheel 12 and the pinion 51, which is connected with the set wheel 12 and lies between the two tooth rack 44, are rotated. As a result, the U-shaped members 39 and the holders 31, which are received therein, together with the telescopes 1, are displaced relative to each other in the groove-like indentation 52 which is formed in the housing shell 28 and serves as guide. The members 39 are displaced, dependent on the rotational direction of the pinion 51, toward or away from each other. During this setting, the control slots 43 and 46 do not change their relative position.

The set screws 30 provide for eyesight compensation in dependence on the optical characteristics of the user eyes. By the rotation of the set screws 30, respectively, the tube 32 with the ocular 4 and the tube 33 with the object lens 2 are axially adjusted relative to each other.

The convergence of the optical axes 25 is adjusted with the set wheel 14. The rotation of the set wheel 14, which remains stationary with respect to the body 5, causes rotation of the pinion 50 and thereby the displacement of the tooth strip 49 in the middle plane 26. The displacement of the tooth strip 49 results in displacement of the strip-shaped constructional element 47, with its edges 48 being guided in the body 5, and the accompanying displacement of the control slot 46. Thereby, the control pin 23 and therewith the tube 33, with the object lens 2, of the holder 31 is axially displaced. Simultaneously, the control pin 23 is displaced along the inclined control slot 43 of the stationary member 39, whereby the holder 31 is pivoted, being movable by its slide along the arcuate driveway 6.

According to a further embodiment of the invention, the control slot 43 is pivotable in its plane, whereby its inclination relative the middle plane 26 is changed. To this end, this control slot is provided in a circular disc which itself pivots in or on of the upper cheek 41 of the member 39. Thereby, the optical axes 25 of the telescopes 1 can be set more steeply with respect to the middle plane 26 at large pupil distances (FIGS. 13 and 14).

From the foregoing description of the binocular telescopic magnifying spectacles, it follows that first the pupil distance of the user is adjusted and then the operational distance. The axes adjustment is connected with the distance adjustment along the arcuate guideways 6 so that the convergence apparatus-eyes-distance does not change. The user can rapidly adjust near and far distances, without any additional adjustment. The coupling of the convergence adjustment with the pupil distance adjustment forms a prerequisite for the use of an apparatus having a standard size by persons with different distances between the eyes. For persons with a large pupil distance, in the near zone, a steeper axes inclination is required for them to clearly see the same near point than for the persons with a smaller pupil distance. Further, the change of the inclination position of a control slot provides for a simple adaptation to interchangeable optics.

The adjustment of the visual axes of both eyeballs (convergence) is effected in dependence on the distance adjustment/accommodation and is controlled spontaneously, independent from the brain. The purpose of the novel binocular telescopic magnifying spectacles is to support a normal visual act which takes place without any auxiliary means. At that, the distance-dependent accommodation, without which the convergence setting of the eyes is incomplete or is even not initiated, is included or forms part of the control slot. The control slot is calculated based on the object-width-dependent vergence (inclination of the visual axis) and the focal-length dependent image width. Taking into account the accommodation, the image width setting (by displacement of the object lens) should be reduced, by using the control slot, by the amount of the accommodation effect of the eyes. This amount is calculated based on the object lens focal length in diopters plus the accommodation effect of the eyes for the corresponding distance in diopters.

| Example: | |
|---|---|
| Object Width | 2 m |
| Object lens focal length | 50 mm |
| Image width | 51.28 mm |
| Ocular focal length | 50 D = 20 mm |
| Accommodation | .50 D |
| Total effect | 50.52–19.80 |
| (Ocular & Accommodation) | |
| Reduction | .2 mm |

Equations and tables for a Control Slot of Prism Magnifying Spectacles
with Zoom-Convergence-Distance Adjustment
Object width (a) as a function of a convergence angle $$a = \frac{PD}{2\tan(8,1)}$$

Table $PD = 64$

| a ... | 0° | = | ∞ |
|---|---|---|---|
| | 1° | = | 1833, 3mm |
| | 2° | = | 916, 4mm |
| | 3° | = | 610, 0mm |
| | 4° | = | 457, 6mm |
| | 5° | = | 365, 8mm |
| | 6° | = | 304, 5mm |
| | 7° | = | 260, 6mm |
| | 7, 3° | = | 250, 0mm |

Image width ($a^1$) as a function of a convergence angle $$a^1 = \frac{a \cdot f}{a - f}$$

Table $PD = 64 \quad f = 34.6 (50.33 + 9D)$

-continued

| a ... | 0° | = | 34, 6mm |
|---|---|---|---|
| | 1° | = | 35, 2mm |
| | 2° | = | 35, 9mm |
| | 3° | = | 36, 7mm |
| | 4° | = | 37, 4mm |
| | 5° | = | 38, 2mm |
| | 6° | = | 39, 0mm |
| | 7° | = | 39, 8mm |
| | 7, 2° | = | 39, 7mm |

LEGENDS FOR THE REFERENCE NUMERALS

| | |
|---|---|
| 1. | Telescope |
| 2. | Object lens |
| 3. | Reversing prism |
| 4. | Ocular |
| 5. | Body |
| G. | Guideway |
| 7. | Slide |
| 8. | Pivot Axis |
| 9. | Ocular exit pupil |
| 10. | Eye |
| 11. | Covergence angle |
| 12. | Set wheel |
| 13. | Drawn-in bolt |
| 14. | Set wheel |
| 15. | Shaft |
| 16. | Eccentric |
| 17. | Member |
| 18. | Helical Spring |
| 19. | Member |
| 20. | Length compensating member |
| 21. | Control member |
| 22. | Control cam |
| 24. | Lens |
| 25. | Optical axis |
| 26. | Middle plane |
| 27. | Body shell |
| 28. | Body shell |
| 29. | Front side |
| 30. | Set screw |
| 31. | Holder |
| 32. | Tube |
| 33. | Tube |
| 34. | Elongate slot |
| 35. | |
| 36. | Cut-out |
| 37. | Tooth rack |
| 38. | Support |
| 39. | Shaped member |
| 40. | Vertical Web |
| 41. | Upper cheek |
| 42. | Lower cheek |
| 43. | Inclined control slot |
| 44. | Tooth rack |
| 45. | Slot |
| 46. | Control slot |
| 47 | Strip-shaped constructional element |
| 48. | Edge |
| 49. | Tooth strip |
| 50. | Pinion |
| 51. | Pinion |
| 52. | Groove-shaped indentation |
| 53. | Groove |
| 54. | Pinion |

What is claimed is:

1. Binocular telescopic magnifying spectacles both telescopes (1) of which include, respectively, an object lens (2) and an ocular (4) and which are supported in a common plane for pivotal movement about parallel imaginary pivot axes, characterized in that the both imaginary pivot axes (8) of the telescopes (1) lie outside of the telescopes (1), respectively, and on a side of the ocular exit pupils (9), remote from the telescopes (1), at a distance (d) from the respective ocular exit pupil (9) which is smaller than the eye diameter (D), and in that the imaginary pivot axes (8) of the telescopes (1) cross, respectively, optical axes (25) of the telescopes (1), and both telescopes (1) are displaceable, respectively, along arcuate guideways (6), wherein centers of guideway-defining arcs coincide with the imaginary pivot axes (8) of the telescopes (1), wherein the optical axes (25) of the telescopes (1) extend, respectively, radially to the guideways (6), and the pivotal movements of both telescopes (1) about their imaginary pivot axes (8) are coupled and both telescopes (1) have, respectively, a same convergence angle, wherein there are provided a convergence setting device for coupling the pivotal movement of both telescopes (1) which includes a first set wheel (14) connected with an eccentric (16) that displaces the telescopes (1) along the guideways (6), and a coupling device for coupling a setting of the convergence angle (11) of the telescopes (1) with a distance setting of the telescopes, wherein for each telescope (1), at least one control cam is provided which is engaged by a control pin (23) displaceable in the direction of the optical axis (25) dependent on the convergence angle (11) of the telescope (1), and the control pin (23) is connected with the object lens (2) of a respective telescope (1) which is displaced along the optical axis (25).

2. Binocular telescopic magnifying spectacles according to claim 1, characterized in that slides (7) are connected with the telescopes (1) displaceable along the guideways (6).

3. Binocular telescopic magnifying spectacles according to claim 1, characterized in that the pivot axes (8) of the telescopes (1) are spaced from respective ocular exit pupils (9) a distance between 5 and 20 mm.

4. Binocular telescopic magnifying spectacles according to claim 3, characterized in that the pivot axes (8) of the telescopes (1) are spaced from the respective ocular exit pupils (9) a distance of about a half of an eye diameter (D).

5. Binocular telescopic magnifying spectacles according to claim 3, characterized in that the ocular exit pupil (9) lies outside of the ocular (4) of a respective telescope (1) by a distance from 10 mm to 20 mm.

6. A binocular telescopic magnifying spectacles according to claim 3, characterized in that the pivot axes (8) of the telescopes (1) are spaced from the respective ocular exit pupils (9) by a distance of 13 mm.

7. Binocular telescoping magnifying spectacles according to claim 1, characterized in that each telescope (1) includes a reversing prism (3) located between the object lens (2) and the ocular (4).

8. Binocular telescopic magnifying spectacles according to claim 7, characterized in that a lens (24) located in an optical path, pivots between the object lens (2) and the reversing prism (3).

9. Binocular telescopic magnifying spectacles according to claim 7, characterized in that the reversing prisms (3) are supported with a possibility of axial displacement, and that there is provided a coupling device for coupling the axial position of the reversing prisms (3) with one of the convergence angle (11) and with the distance setting.

10. Binocular telescopic magnifying spectacles according to claim 7, characterized in that the coupling device is formed as a rigid connection between the object lens (2) and the reversing prism (3).

11. Binocular telescopic magnifying spectacles according to claim 1, characterized in that the ocular (4) has a substantially rectangular cross-section, with a length-to-width rate of 4:3.

12. Binocular telescopic magnifying spectacles according to claim 11, characterized in that at least a portion of at least one of visual field stop and an aperture stop has a with a length-to-width ratio of 4:3.

13. A binocular telescopic magnifying spectacles both telescopes (1) of which include, respectively, an object lens (2), and an ocular (4) and which are supported in a common plane for pivotal movement about parallel imaginary pivot axes, characterized in that the both imaginary pivot axes (8) of the telescopes (1) lie outside of the telescopes (1), respectively, and on a side (1) of the ocular exit pupils (9), remote from the telescopes, at a distance (d) from the respective ocular exit pupil (9) which is smaller than the eye diameter (D), and in that the imaginary pivot axes (8) of the telescopes (1) cross, respectively, optical axes (25) of the telescopes (1), and both telescopes (1) are displaceable, respectively, along arcuate guideways (6), wherein centers of guideway defining arcs coincide with the imaginary pivot axes (8) of the telescopes (1), wherein the optical axes (25) of the telescopes (1) extend, respectively, radially to the guideways (6), and the pivotal movements of both telescopes (1) about their imaginary pivot axes (8) are coupled and both telescopes (1) have, respectively, a same convergence angle, and wherein there is provided a pupil distance setting device for adjusting the distance of both the imaginary pivot axes of the telescopes (1) which includes a second set wheel (12) connected with nuts in which drawn-in bolts (13), which are fixedly connected with the guideways (6) and which have opposed threads, are received.

14. Binocular telescoping magnifying spectacles according to claim 13, characterized in that each telescope (1) includes a reversing prism (3) located between the object lens (2) and the ocular (4).

15. Binocular telescopic magnifying spectacles both telescopes (1) of which include, respectively, an object leans (2), and an ocular (4) and which are supported in a common plane for pivotal movement about parallel imaginary axes, characterized in that the both imaginary pivot axes (8) of the telescopes (1) lie outside of the telescopes (1), respectively, and on a side of the ocular exist pupils (9), remote from the telescopes (1), at a distance (d) from the respective ocular exit pupil (9) which is smaller than the eye diameter (D), and in that the imaginary pivot axes (8) of the telescopes (1) cross, respectively, optical axes (25) of the telescopes (1) and but telescopes (1) are displaceable, respectively, along arcuate guideways (6), wherein centers of guideway-defining arcs coincide with the imaginary pivot axis (8) of the telescopes (1), wherein the optical axes (25) of the telescopes (1) extend, respectively, radially to the guideways (6), and the pivotal movements of both telescopes (1) about their imaginary pivot axes (8) are coupled and both telescopes (1) have, respectively, a same convergence angle, wherein the telescopes (1) are displaceably arranged in a parallelepiped-shaped holders (31), respectively, with each holder (31) having an elongate groove (34) extending in an axial direction of a respective telescope (1), wherein a control pin (23), which is secured at one end thereof to the respective telescope (1), projects through the elongate groove (34), and wherein the spectacles further include means for enabling displacement of the respective telescope (1) axially and angularly and including two control slots (43, 46) through which the control pin (23) projects, with one of the control slots (46) being arranged in a middle plane (26) of the telescopic magnifying spectacles and another of the control slots (43) being transversely displaceable relative to the one of the control slots (46), and with both control slots (43, 46) intersecting each other.

16. Binocular telescopic magnifying spectacles according to claim 15, characterized in that the one of the control slots (46) of the two telescopes extends perpendicular to the middle plane (26), and in that both another control slots (43) of the telescopes (1), converge from outside toward the middle plane (26).

17. Binocular telescopic magnifying spectacles according to claim 16, characterized in that the another of the control slots (43) pivot in their plane for changing their angular position relative to the middle plane (26).

18. Binocular telescopic magnifying spectacles according to claim 15, characterized in that there is provided a slide (7) at a side of the holder (31) remote from the elongate slot (34).

19. Binocular telescopic magnifying spectacles according to claim 18, characterized in that the holders (31) are received, respectively, in a U-shaped members (39), which abut each other with their vertical webs (40) whereby their respective cheeks (41, 42) become connected, and the one (43) of the control slots is provided in a respective upper cheek (41), and the arcuate guideway (6), in which the slide (7) of the holder (31) is located, lies in a lower cheek (42).

20. Binocular telescopic magnifying spectacles according to claim 19, characterized in that the arcuate guideways (6)-containing cheeks (42) of respective U-shaped members (39) are arranged in a groove-shaped indentation (52) which extends perpendicular to the middle plane (26), serves as a guide, and is formed in a housing shell (28) in which the telescopic magnifying spectacles are received.

21. Binocular telescopic magnifying spectacles according to claim 19, characterized in that tooth racks (44), which extend parallel to each other and perpendicular to the middle plane (26), are connected with the respective U-shaped members (39), and a pinion (51) is arranged therebetween.

22. A binocular telescopic magnifying spectacles according to claim 15, characterized in that the control slots (46), which are displaceable in the middle plane (26) and extend perpendicular thereto, are provided in a strip-shaped constructional element (47) having, in its middle section, a tooth strip (49) extending in a displacement direction of the control slot (46) and engageable with a pinion (SO) rotatably supported in a body part, and in that the side edges (48) of the strip-shaped constructional element (47), which extend parallel to the tooth strip (49), are bent upward and are received in guide grooves formed in a body shell (27).

23. Binocular telescoping magnifying spectacles according to claim 15, characterized in that each telescope (1) includes a reversing prim (3) located between the object lens (2) and the ocular (4).

24. Binocular telescopic magnifying spectacles according to the claim 15, characterized in that each holder (31) is formed as a strip-shaped holder, and in that the one of the control slots (46) is provided in the strip-shaped holder.

25. A binocular telescopic magnifying spectacles both telescopes (1) of which include, respectively, an object lens (2) and an ocular (4) and which are supported in a common parallel for pivotal movement about parallel imaginary pivot axes, characterized in that the both imaginary pivot axes (8) for the telescopes (1) lie outside of the telescopes (1), respectively, and on a side of the ocular exit pupils (9), remote from the telescopes (1), at a distance (d) from the respective ocular exit pupil (9) which is smaller than the eye diameter (D),and in that the imaginary pivot axes (8) of the telescopes (1) cross, respectively, optical axes (25) of the telescopes, and both telescopes (1) are displaceable, respectively, along arcuate guideways (6), wherein centers of the guideway-defining arcs coincide with the imaginary pivot axis (8) of the telescopes (1), and wherein the optical axes (25) of the telescopes (1) extend, respectively, radially to the guideways (6), the pivotal movements of both telescopes (1) have, respectively, a same convergence angle, wherein the object lens (2) of the telescope (1), on one hand, and the ocular (4), on the other hand, are arranged in separate tubes (32, 33) received in a holder (31), wherein the ocular (4)—receiving tube (32) is displaced relative to the holder (31) by a tooth drive, and wherein the ocular (4)—receiving tube (32) has, on outer side thereof, a tooth rack (37) which extends in a axial direction of the tube (32), lies in a slot-like recess (36) of the holder (31), and is engageable with a pinion (54) rotatably support on the holder (31).

26. Binocular telescoping magnifying spectacles according to claim 25, characterized in that each telescope (1) includes a reversing prism (3) located between the object lens (2) and the ocular (4).

\* \* \* \* \*